Figure 1:
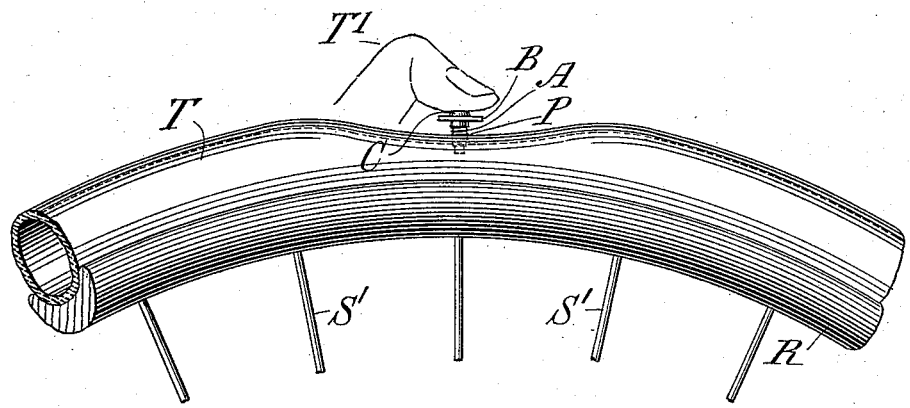

(No Model.)

W. B. MERRITT.
DEVICE FOR CLOSING TUBE PUNCTURES.

No. 570,941. Patented Nov. 10, 1896.

WITNESSES:
C. E. Ashley
H. W. Lloyd.

INVENTOR:
William B. Merritt
By his Attorney

UNITED STATES PATENT OFFICE.

WILLIAM B. MERRITT, OF BRAINTREE, MASSACHUSETTS, ASSIGNOR OF TWO-THIRDS TO GEORGE W. ARNOLD AND EDWARD H. KINNEY, OF BROOKLYN, NEW YORK.

DEVICE FOR CLOSING TUBE PUNCTURES.

SPECIFICATION forming part of Letters Patent No. 570,941, dated November 10, 1896.

Application filed April 23, 1896. Serial No. 588,720. (No model.)

*To all whom it may concern:*

Be it known that I, WILLIAM B. MERRITT, a citizen of the United States, and a resident of Braintree, in the county of Norfolk and State of Massachusetts, have made certain new and useful Improvements in a Device for Closing Tube Punctures, of which the following is a specification.

My invention is an improvement in devices for repairing punctured tubes or pipes of flexible material, like rubber, frequently employed for wheel-tires for such vehicles as bicycles. These tubes are usually expanded by air under pressure and often become punctured in use and when at a distance from convenient facilities for repairing them.

The object of my invention is to provide a mechanical device, occupying small space, which can be quickly applied without the use of special tools and in exposed and otherwise inconvenient locations.

My invention consists in providing two surfaces placed opposite each other in area slightly greater than the puncture. These surfaces must conform to each other to a certain extent and when in position are united mechanically, as by a screw. One surface is connected with and forms part of a piece or part of such an outline that it can be readily introduced through the puncture to take its position upon the inside of the tube. I prefer to employ a piece in the form of a truncated cone or pyramid, the base being employed as the contact-surface to rest or press against the inside of the tube over the hole or puncture. The apex of the cone is small enough to easily enter the hole or puncture, and I place a helical groove or screw-thread in the cone-surface to permit of rotating the cone into position while the rubber tube is soft and yielding. I perforate the center of the base and tap it with a screw-thread. For an outside contact-surface I prefer a ring or collar having a contact-surface conforming to the base of the cone; that is to say, both surfaces may be flat or plane or one may be convex and one concave. The opposite side of the ring or collar is curved to conform to the outline of the tube or pipe as near as possible. I provide a screw with a broad flat head to unite the ring or collar with the cone inside the tube, and when the two contact-surfaces are in position and tightly united by the screw an air-tight joint is formed around the edge of the puncture.

Of course I may do away with the collar or ring and employ the broad flat screw-head for the exterior contact-surface, but I prefer to employ the ring, as the rotation of the screw in contact with the outer surface of the pipe tends to displace the edges of the puncture. The center of the ring or collar is preferably countersunk or depressed to receive the screw-head and preserve a uniform outline.

The device described is of great utility in repairing punctured bicycle-tires. The punctures in this class of tubes usually occur in the form of slits or slots and are produced by running over a fragment of glass or stone having a ragged cutting edge. When such a puncture is to be repaired, before applying the mechanical closing device I cut a round hole through the puncture with a belt-punch or similar tool, and in order to facilitate the introduction of the cone-piece I fix to it for such temporary use a slotted or perforated plate.

The accompanying drawings illustrate my invention.

Figure 2:
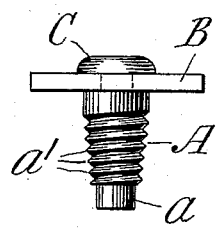
Figure 4:
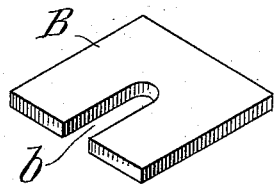
Figure 5:
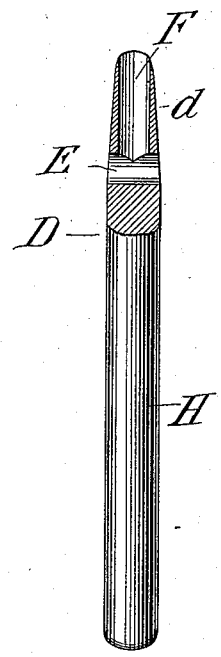
Figure 3:
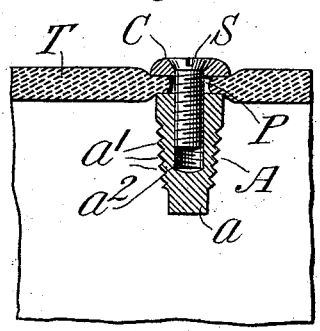

Figure 1 shows a section of a punctured rubber tube used as a wheel-tire and the closing device in the process of application. Fig. 2 shows the complete device with a slotted plate in position, the latter being employed to facilitate application. Fig. 3 is a section of the punctured tube and the closing device in position therein. Fig. 4 shows the slotted plate; Fig. 5, a form of punch to produce a round hole through the puncture; Fig. 6, a grooved or corrugated surface cone or nut, and Fig. 7 a smooth-surfaced cone or nut.

A is a nut in the form of a truncated cone. The diameter of its apex is small enough to easily pass through the punctured hole. Its base is large enough in area to fully cover the punctured hole and present a good contact-surface. There is a threaded hole in the center of the base to receive a screw S. The sides of the cone are screw-threaded, as at $a'$. The base of the cone is preferably a plane surface; but it may be concave or convex. The second or outside surface C conforms to the plane surface of the base. This second surface is part of a ring or collar curved on its upper side to conform to the surface of the inflated tube and avoid any angularity. The ring or collar C is countersunk to receive the head of screw S and maintain a uniform exterior outline.

In Fig. 1, T is a tube employed as a wheel-tire. It is punctured at P. R indicates the rim of a wheel, and S' the spokes, all of usual construction. Preparatory to applying the closing device I prefer to punch out a round hole at or near the center of the punctured slit or slot, so that when screw S is in position the edges of the cut lie smoothly in place. I employ a punch D, of metal, having circular holes at F and E, tapered to a knife-edge at $d$, its opposite end terminating in a handle H.

In Fig. 4, B is a metal plate having a slot $b$ to receive the screw S.

The devices shown in Figs. 4 and 5 are convenient for use in applying the closing device, but are not necessary and are not novel in themselves when considered in a patentable sense.

When a puncture occurs in a rubber tube, if it contains air under pressure it escapes, and, assuming the puncture to be the commonly-occurring slit, I take the punch D and cut a hole in the perforation, near the center thereof. I then take the parts A and C and place the part B between them and introduce screw S, screwing it down firmly. I then introduce the apex of the cone-nut into the round hole in the puncture and turn it through (see T', Fig. 1) until the part B makes contact with the outer surface of the tire. The part B has now fulfilled its function by providing an enlarged holding-surface for the hand and as a gage to limit the extent to which the device is introduced. I now loosen the screw S, slide the plate B out, and by applying pressure, as shown, by the use of the thumb T', Fig. 1, force the cone-nut through the tube-wall. The edge of the hole or puncture in the tube-wall now closes upon the screw S, between the parts A and C, and the nut is held with one hand by pressing the collapsed tire upon it with the thumb and fingers passed around the rim from the inside. This is to prevent the nut from turning as the screw S is firmly screwed into position, thus clamping the edges of the puncture and making an airtight junction, as shown in Fig. 3.

The device is mechanical in its nature, the parts described being of metal, although hard rubber may be used for the nut, if desired.

What I claim, and desire to secure by Letters Patent, is—

1. A device for closing tube punctures consisting of a piece or nut of tapering section having a helical groove in its surface, a second piece or disk having a surface formed to coöperate with the base of said tapering section and a screw uniting the two sections, substantially as described.

2. A device for closing tube punctures consisting of a piece or nut of tapering section having a helical groove or thread in its surface, a disk having a surface formed to coöperate with the base of said tapering section and means for removably uniting said sections, substantially as described.

3. A device for closing tube punctures consisting of a piece or part of tapering longitudinal cross-section having a screw-thread on its surface, a ring or washer having a surface formed to coöperate with the base of said tapering piece and means for uniting said tapering piece and ring or washer, substantially as described.

WILLIAM B. MERRITT.

Witnesses:
THOMAS P. HARRISON,
ROBERT E. BELCHER.